(12) United States Patent
Chen

(10) Patent No.: US 11,686,925 B2
(45) Date of Patent: Jun. 27, 2023

(54) WIDE-ANGLE LENS ASSEMBLY INCLUDING FIVE LENSES OF -+++-, OR SIX LENSES OF -++-+- REFRACTIVE POWERS

(71) Applicants: Sintai Optical (Shenzhen) Co., Ltd., ShenZhen (CN); Asia Optical Co., Inc., Taichung (TW)

(72) Inventor: Yuan-Chen Chen, Taichung (TW)

(73) Assignees: SINTAI OPTICAL (SHENZHEN) CO., LTD., Shenzhen (CN); ASIA OPTICAL CO., INC., Taichung (TW)

(*) Notice: Subject to any disclaimer, the term of this patent is extended or adjusted under 35 U.S.C. 154(b) by 279 days.

(21) Appl. No.: 16/994,732

(22) Filed: Aug. 17, 2020

(65) Prior Publication Data

US 2021/0191091 A1  Jun. 24, 2021

(30) Foreign Application Priority Data

Dec. 19, 2019  (CN) .......................... 201911320621.7

(51) Int. Cl.
  *G02B 13/06* (2006.01)
  *G02B 9/62* (2006.01)
  *G02B 13/18* (2006.01)
  *G02B 9/60* (2006.01)

(52) U.S. Cl.
  CPC ............. *G02B 13/06* (2013.01); *G02B 9/60* (2013.01); *G02B 9/62* (2013.01); *G02B 13/18* (2013.01)

(58) Field of Classification Search
  CPC ............. G02B 13/06; G02B 9/60; G02B 9/62
  See application file for complete search history.

(56) References Cited

U.S. PATENT DOCUMENTS

| 9,857,560 B2 | 1/2018 | Liu et al. | |
| 2019/0094493 A1* | 3/2019 | Lin | G02B 9/62 |
| 2022/0082792 A1* | 3/2022 | Chen | G02B 9/62 |

FOREIGN PATENT DOCUMENTS

| CN | 106772927 A | 5/2017 |
| CN | 109247904 A | 1/2019 |
| CN | 109324394 A | 2/2019 |
| EP | 3312653 A1 | 4/2018 |
| JP | 2012230434 A | 11/2012 |
| JP | 2013114261 A | 6/2013 |
| TW | I570438 B | 2/2017 |
| TW | 201910853 A | 3/2019 |

* cited by examiner

*Primary Examiner* — Wen Huang
(74) *Attorney, Agent, or Firm* — McClure, Qualey & Rodack, LLP

(57) ABSTRACT

A wide-angle lens assembly includes a first lens, a second lens, a third lens, a fourth lens, and a fifth lens, all of which are arranged in order from an object side to an image side along an optical axis. The first lens is a meniscus lens with negative refractive power. The second lens is a meniscus lens with positive refractive power. The third lens is with positive refractive power and comprises a convex surface facing an object side. The fourth lens is with positive refractive power. The fifth lens is with negative refractive power. The wide-angle lens assembly satisfies: 3<TTL/BFL<3.5; wherein TTL is an interval from an object side surface of the first lens to an image plane along the optical axis and BFL is an interval from an image side surface of the fifth lens to the image plane along the optical axis.

14 Claims, 16 Drawing Sheets

WIDE-ANGLE LENS ASSEMBLY INCLUDING FIVE LENSES OF -+++-, OR SIX LENSES OF -++-+- REFRACTIVE POWERS

BACKGROUND OF THE INVENTION

Field of the Invention

The invention relates to a wide-angle lens assembly.

Description of the Related Art

The current development trend of a wide-angle lens assembly is toward miniaturization and large field of view. Additionally, the wide-angle lens assembly is developed to have high resolution and resistance to severe environment temperature variation in accordance with different application requirements. However, the known wide-angle lens assembly can't satisfy such requirements. Therefore, the wide-angle lens assembly needs a new structure to meet the requirements of miniaturization, large field of view, high resolution, and resistance to severe environment temperature variation at the same time.

BRIEF SUMMARY OF THE INVENTION

The invention provides a wide-angle lens assembly to solve the above problems. The wide-angle lens assembly of the invention is provided with characteristics of a shortened total lens length, a larger field of view, a high resolution, a resistance to severe environment temperature variation, and still has a good optical performance.

The wide-angle lens assembly in accordance with an exemplary embodiment of the invention includes a first lens, a second lens, a third lens, a fourth lens, and a fifth lens. The first lens is a meniscus lens with negative refractive power. The second lens is a meniscus lens with positive refractive power. The third lens is with positive refractive power and comprises a convex surface facing an object side. The fourth lens is with positive refractive power. The fifth lens is with negative refractive power. The first lens, the second lens, the third lens, the fourth lens, and the fifth lens are arranged in order from the object side to an image side along an optical axis. The wide-angle lens assembly satisfies: $3<TTL/BFL<3.5$; wherein TTL is an interval from an object side surface of the first lens to an image plane along the optical axis and BFL is an interval from an image side surface of the fifth lens to the image plane along the optical axis.

In another exemplary embodiment, the first lens further includes a convex surface facing the object side and a concave surface facing the image side, the second lens further includes a concave surface facing the object side and a convex surface facing the image side, the third lens further includes a convex surface facing the image side, and the fourth lens further includes a convex surface facing the object side and a convex surface facing the image side, the fifth lens further includes a concave surface or a convex surface facing the object side and a concave surface facing the image side.

In yet another exemplary embodiment, the wide-angle lens assembly satisfies: $-3<f_2/f_1<-1$, wherein $f_1$ is an effective focal length of the first lens and $f_2$ is an effective focal length of the second lens.

In another exemplary embodiment, the wide-angle lens assembly satisfies: $1<f_2/f_4<3$, wherein $f_2$ is an effective focal length of the second lens and $f_4$ is an effective focal length of the fourth lens.

In yet another exemplary embodiment, the wide-angle lens assembly satisfies: $0.5<f_1/f_5<1.5$, wherein $f_1$ is an effective focal length of the first lens and $f_5$ is an effective focal length of the fifth lens.

In yet another exemplary embodiment, the wide-angle lens assembly satisfies: $3<R_{11}/R_{12}<5$; $-11<R_{31}/R_{32}<-3$; wherein $R_{11}$ is a radius of curvature of the object side surface of the first lens, $R_{12}$ is a radius of curvature of the image side surface of the first lens, $R_{31}$ is a radius of curvature of the object side surface of the third lens, and $R_{32}$ is a radius of curvature of the image side surface of the third lens.

In yet another exemplary embodiment, the wide-angle lens assembly satisfies: $20<TTL/T_1<21.5$, wherein $T_1$ is a thickness of the first lens along the optical axis.

In yet another exemplary embodiment, the wide-angle lens assembly satisfies: $8<TTL/T_3<10$, $T_3$ is a thickness of the third lens along the optical axis.

In yet another exemplary embodiment, the wide-angle lens assembly satisfies: $10<TTL/T_4<13$, $T_4$ is a thickness of the fourth lens along the optical axis.

In yet another exemplary embodiment, the wide-angle lens assembly satisfies: $72.08<TTL/AT_{34}<114.31$; $106.3<TTL/AT_{45}<115.7$; wherein $AT_{34}$ is an air-interval between the third lens and the fourth lens along the optical axis and $AT_{45}$ is an air-interval between the fourth lens and the fifth lens along the optical axis.

In yet another exemplary embodiment, the wide-angle lens assembly further comprises a sixth lens located between the third lens and the fourth lens. The sixth lens with negative refractive power has a concave surface facing the object side and another concave surface facing the image side.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein.

DETAILED DESCRIPTION OF THE INVENTION

The following description is made for the purpose of illustrating the general principles of the invention and should not be taken in a limiting sense. The scope of the invention is best determined by reference to the appended claims.

The invention provides a wide-angle lens including a first lens which is a meniscus lens with negative refractive power, a second lens which is a meniscus lens with positive refractive power, a third lens with positive refractive power, a fourth lens with positive refractive power, and a fifth lens with negative refractive power. The first lens, the second lens, the third lens, the fourth lens, and the fifth lens are arranged in order from an object side to an image side along an optical axis. The wide-angle lens assembly satisfies: 3<TTL/BFL<3.5; wherein TTL is an interval from an object side surface of the first lens to an image plane along the optical axis and BFL is an interval from an image side surface of the fifth lens to the image plane along the optical axis.

Referring to Table 1, Table 2, Table 3, Table 4, Table 5, Table 6, Table 7, Table 8, Table 9, Table 10, Table 11 and Table 12, wherein Table 1, Table 4, Table 7, and Table 10 show the parameters of the lenses in accordance with the first embodiment to the fourth embodiment of the invention respectively. Table 2, Table 5, Table 8, and Table 11 show the parameters of aspheric surfaces of each aspheric lenses in Table 1, Table 4, Table 7, and Table 10 respectively.

Figure 1:
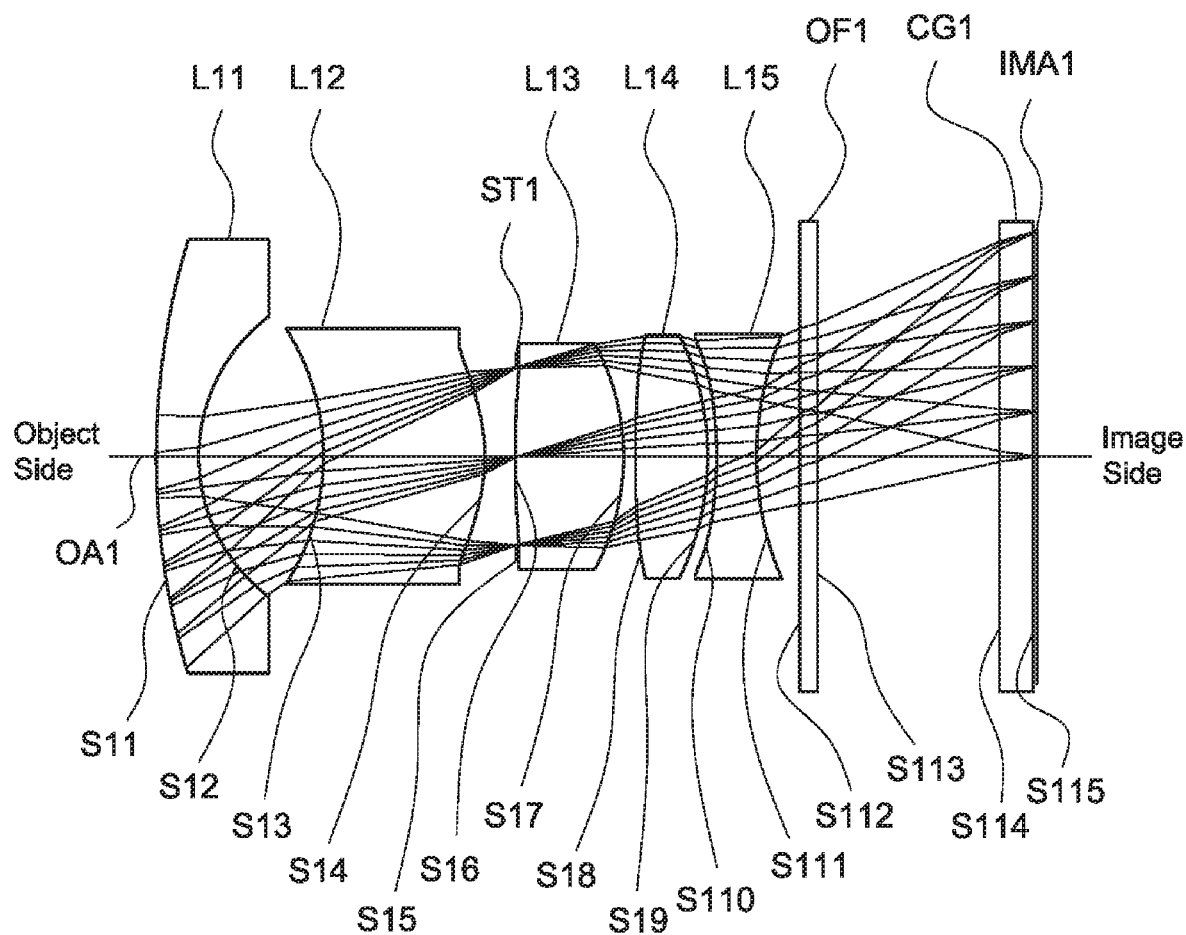
FIG. 1 is a lens layout diagram and an optical path of a wide-angle lens assembly in accordance with a first embodiment of the invention.
Figure 3:
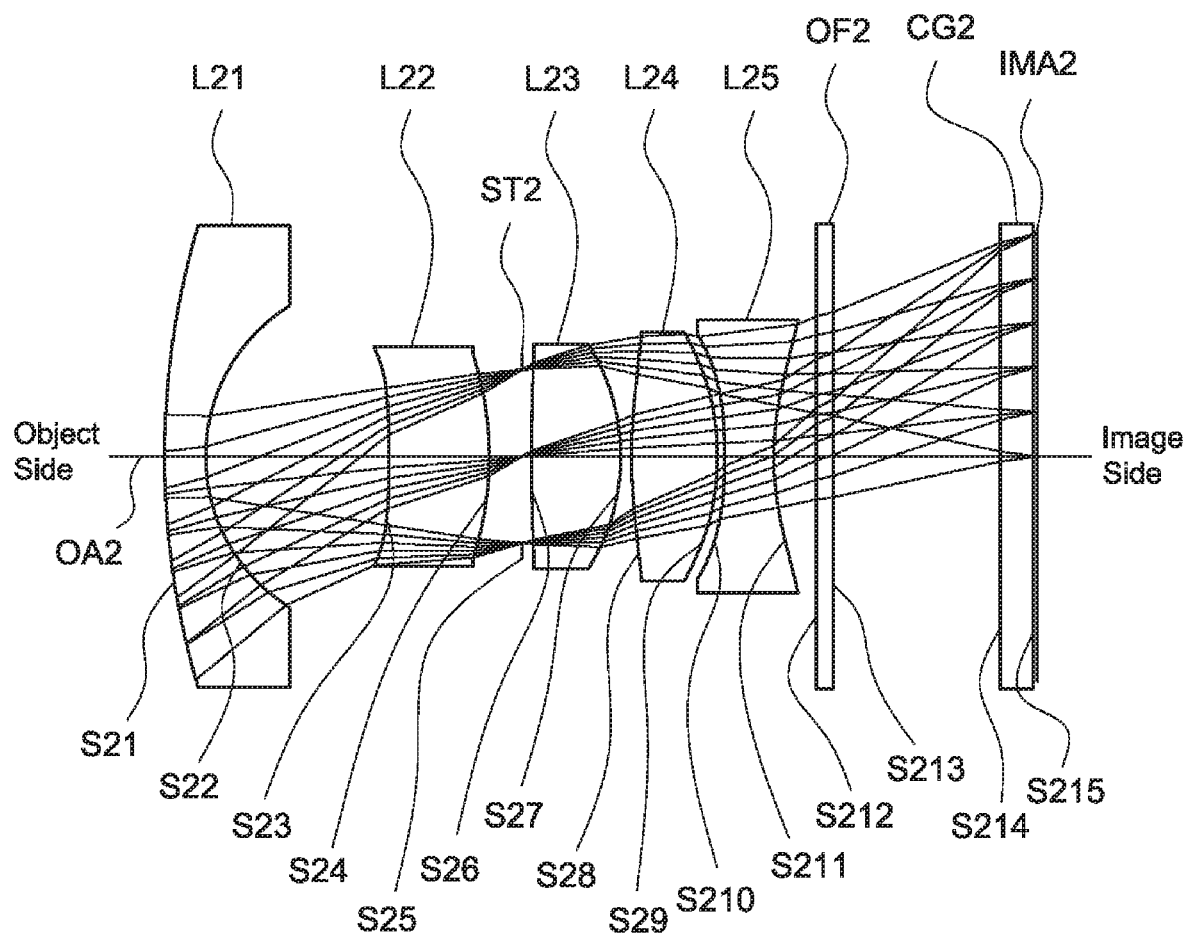
FIG. 3 is a lens layout diagram and an optical path of a wide-angle lens assembly in accordance with a second embodiment of the invention.
Figure 5:
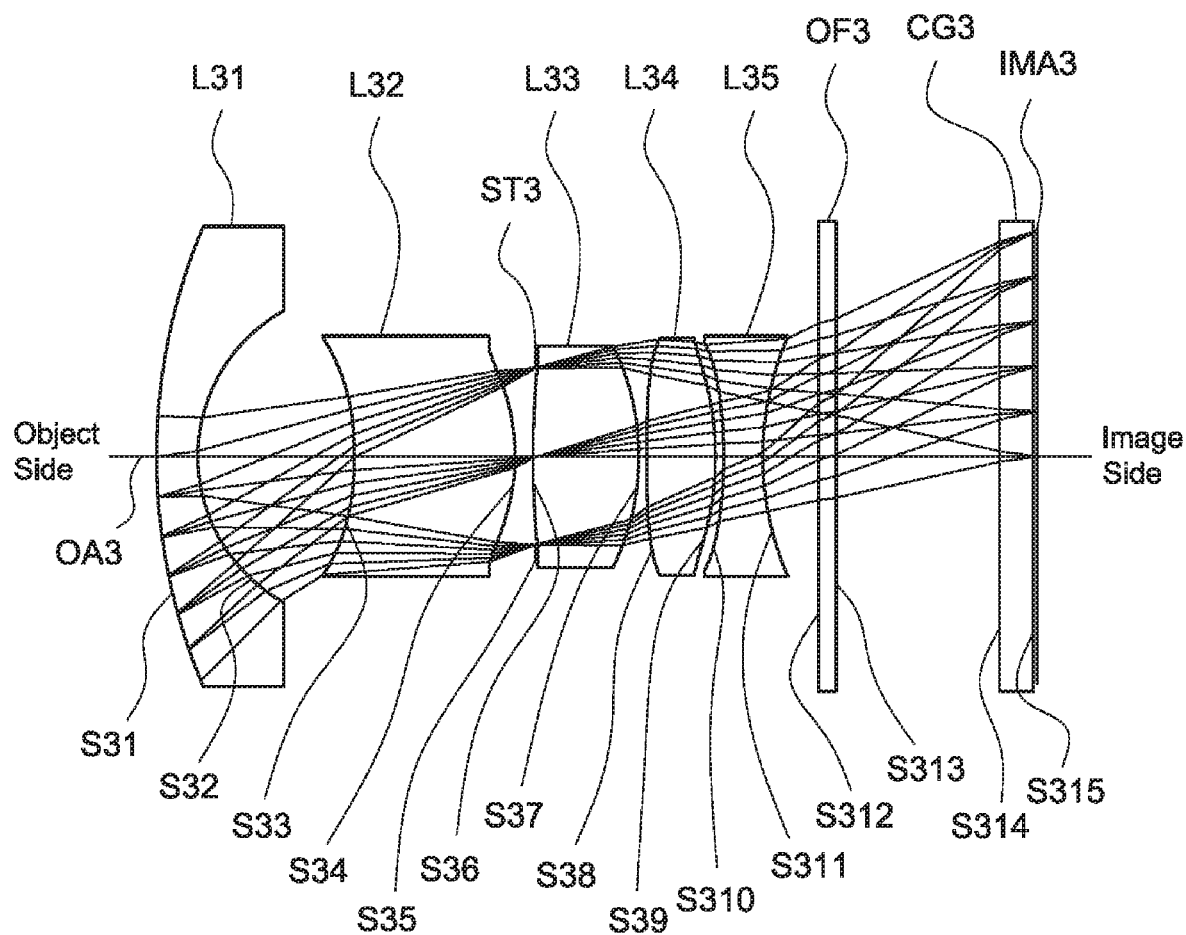
FIG. 5 is a lens layout diagram and an optical path of a wide-angle lens assembly in accordance with a third embodiment of the invention.
Figure 7:
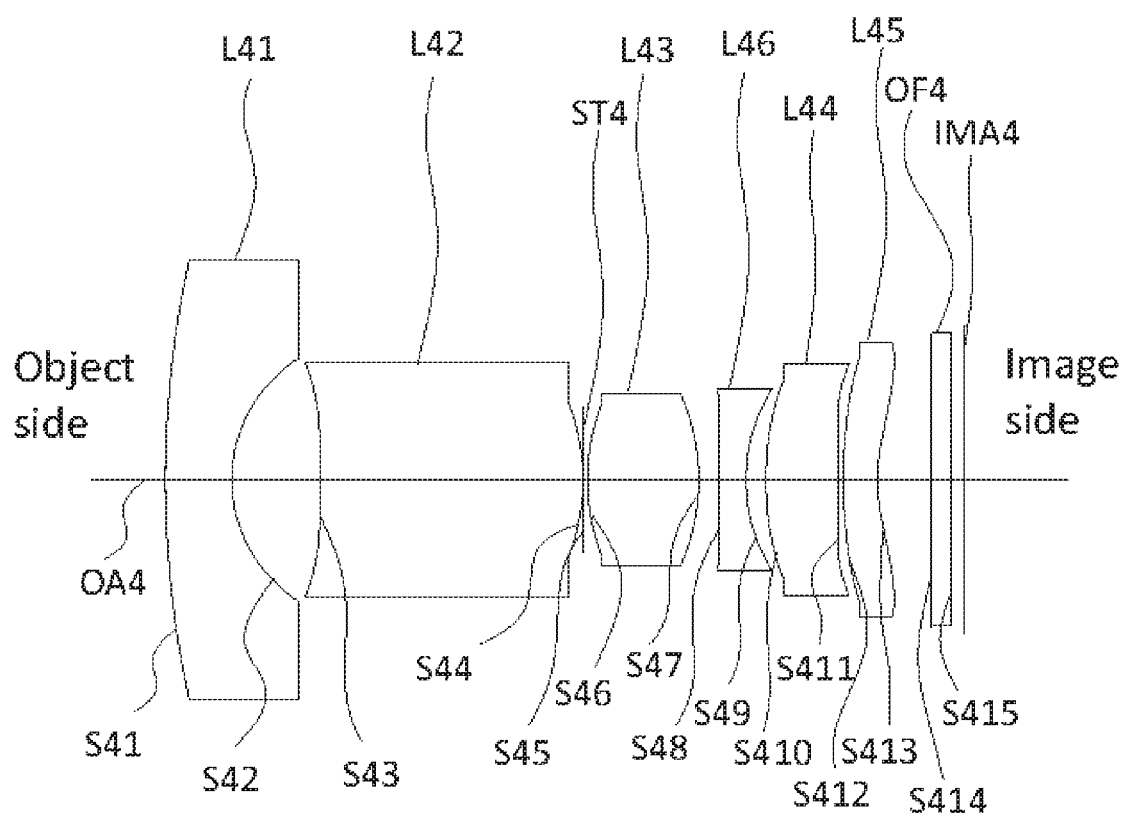
FIG. 7 is a lens layout diagram of a wide-angle lens assembly in accordance with a fourth embodiment of the invention.

FIG. 1, FIG. 3, and FIG. 5 are the lens layout diagram and the optical path of the wide-angle lens assembly in accordance with the first embodiment, the second embodiment, and the third embodiment of the invention respectively. FIG. 7 is the lens layout diagram of the wide-angle lens assembly in accordance with the fourth embodiment. The first lenses L11, L21, L31, L41 are meniscus lenses with negative refractive power and are made of glass. The objective surfaces of the first lenses S11, S21, S31, S41 are convex. The image surfaces of the first lenses S12, S22, S32, S42 are concave. Both of the objective surfaces S11, S21, S31, S41 and the image surfaces S12, S22, S32, S42 are spherical surfaces.

The second lenses L12, L22, L32, L42 are meniscus lenses with positive refractive power. In accordance with the first to the third embodiment, the second lenses L12, L22, L32 are made of plastic. In accordance with the fourth embodiment, the second lens L42 is made of glass. The objective surfaces thereof S13, S23, S33, S43 are concave. The image surfaces thereof S14, S24, S34, S44 are convex. Both the objective surfaces S13, S23, S33, S43 and the image surface S14, S24, S34, S44 are aspherical surface.

The third lenses L13, L23, L33, L43 are biconvex lenses with positive refractive power and are made of glass. Both the objective surfaces S16, S26, S36, S46 and the image surfaces thereof S17, S27, S37, S47 are convex and spherical surfaces.

The fourth lenses L14 L24, L34, L44 are biconvex lenses with positive refractive power. In accordance with the first to the third embodiment, the fourth lenses L14, L24, L34 are made of plastic. In accordance with the fourth embodiment, the fourth lens L44 is made of glass. Both the objective surfaces S18, S28, S38, S410 and the image surfaces thereof S17. S27, S37, S411 are convex and aspherical surfaces.

The fifth lenses L15, L25. L35, L45 are with negative refractive power. In accordance with the first to the third embodiment, the fifth lenses L15, L25, L35 are made of plastic. In accordance with the fourth embodiment, the fifth lens L45 is made of glass. The objective surfaces S110, S210, S310, S412 thereof are concave or convex. The image surfaces thereof S111, S211, S311, S413 are concave. Both the objective surfaces S110, S210, S310, S412 and image surfaces thereof S111, S211, S311, S413 are aspherical surfaces.

The sixth lenses L46 is with negative refractive power and are made of glass. Both the objective surface S48 and the image surface thereof S49 are concave and aspherical surfaces.

In addition, the lens assemblies 1, 2, 3, 4 satisfy at least one of the following conditions:

$$3<TTL/BFL<3.5 \tag{1}$$

$$-3<f_2/f_1<-1 \tag{2}$$

$$1<f_2/f_4<3 \tag{3}$$

$$0.5<f_1/f_5<1.5 \tag{4}$$

$$3<R_{11}/R_{12}<5 \tag{5}$$

$$-11<R_{31}/R_{12}<-3 \tag{6}$$

$$20<TTL/T_1<21.5 \tag{7}$$

$$8<TTL/T_3<10 \tag{8}$$

$$10<TTL/T_4<13 \tag{9}$$

$$72.08<TTL/AT_{34}<114.31 \tag{10}$$

$$106.3<TTL/AT_{45}<115.7 \tag{11}$$

For the first embodiment to the fourth embodiment, TTL is an interval from the object side surfaces S11. S21, S31, S41 of the first lenses L11, L21, L31, L41 to the image planes IMA1, IMA2, IMA3, IMA4 along the optical axes OA1, OA2, OA3, OA4 respectively. BFL is an interval from the image side surface S111, S211, S311, S413 of the fifth lenses L15, L25, L35, L45 to the image planes IMA1, IMA2, IMA3, IMA4 along the optical axes OA1, OA2, OA3, OA4 respectively, $f_1$ is an effective focal length of the first lenses L11, L21, L31, L41, $f_2$ is an effective focal length of the second lenses L12, L22, L32, L42, $f_4$ is an effective focal length of the fourth lenses L14, L24, L34, L44, $f_5$ is an effective focal length of the fifth lenses L15, L25, L35, L45. $R_{11}$ is a radius of curvature of the object side surfaces S11, S21, S31, S41 of the first lenses L11, L21, L31, L41. $R_{12}$ is a radius of curvature of the image side surfaces S12, S22, S32, S42 of the first lenses L11, L21, L31, L41. $R_{31}$ is a radius of curvature of the objective side surfaces S16, S26, S36, S46 of the third lenses L13, L23, L33, L43. $R_{32}$ is a radius of curvature of the image side surfaces S17, S27, S37, S47 of the third lenses L13, L23, L33, L43. $T_1$ is a thickness of the first lenses L11, L21, L31, L41 along the optical axes OA1, OA2, OA3, OA4. $T_3$ is a thickness of the third lenses L13, L23, L33, L43 along the optical axes OA1, OA2, OA3, OA4. $T_4$ is a thickness of the fourth lenses L14, L24, L34, L44 along the optical axes OA1, OA2, OA3, OA4. $AT_{34}$ is an air-interval from the third lenses L13, L23, L33, L43 to each fourth lenses L14, L24, L34, L44 along the optical axes OA1, OA2, OA3, OA4. With the lens assemblies 1, 2, 3, 4 satisfying at least one of the above conditions (1)-(11), total lens length can be effectively shorten, the field of view can be effectively increased, the resolution can be effectively increased, the environmental temperature change can be effectively resisted, and the aberration can be effectively corrected.

A detailed description of the lens assembly in accordance with the first embodiment of the invention is as follows. Referring to FIG. 1, the lens assembly 1 includes a first lens L11, a second lens L12, a stop ST1, a third lens L13, a fourth lens L14, a fifth lens L15, an optical filter OF1, and a cover glass CG1, all of which are arranged in order from an object side to an image side along an optical axis OA1. In operation, an image of light rays from the object side is formed at an image plane IMA1.

According to the foregoing, wherein both an objective surface S112 and an image surface S113 of the optical filter OF1 are flat surfaces;

Both an objective surface S114 and an image surface S115 of the cover glass CG1 are flat surfaces:

With the above design of the lenses and stop ST1 and at least any one of the conditions (1)-(11) satisfied, the lens assembly 1 can have an effective shorter total lens length, an effective increased field of view, an effective increased resolution, an effective resisted environmental temperature change, and is capable of an effective corrected aberration.

Table 1 shows the optical specification of the lens assembly 1 in FIG. 1.

TABLE 1

| Effective Focal Length = 2.31706 mm | | | F-number = 2.24 | | | |
|---|---|---|---|---|---|---|
| Total Lens Length = 10.50 mm | | | Field Of View = 134.5 Degrees | | | |
| Surface Number | Radius of Curvature (mm) | Thickness (mm) | Nd | Vd | Effective Focal Length (mm) | Remark |
| S11 | 9.00 | 0.51 | 1.788001 | 47.3685 | −3.5488 | The First Lens L11 |
| S12 | 2.09 | 1.48 | | | | |
| S13 | −3.28 | 1.93 | 1.543915 | 55.9512 | 7.9227 | The Second Lens L12 |
| S14 | −2.25 | 0.38 | | | | |
| S15 | ∞ | −0.01 | | | | Stop ST1 |
| S16 | 13.28 | 1.29 | 1.58913 | 61.135 | 4.03 | The Third Lens L13 |
| S17 | −2.80 | 0.14 | | | | |
| S18 | 25.00 | 0.87 | 1.543915 | 55.9512 | 5.20 | The Fourth Lens L14 |
| S19 | −3.17 | 0.10 | | | | |
| S110 | −6.27 | 0.48 | 1.661342 | 20.3729 | −3.70 | The Fifth Lens L15 |
| S111 | 4.20 | 0.52 | | | | |
| S112 | ∞ | 0.210 | 1.517 | 64.167 | | Optical Filter OF1 |
| S113 | ∞ | 2.169 | | | | |
| S114 | ∞ | 0.400 | 1.517 | 64.167 | | Cover Glass CG1 |
| S115 | ∞ | 0.045 | | | | |

The aspheric surface sag z of each aspheric lens in table 1 can be calculated by the following formula:

$$z = ch^2 / \{1+[1-(k+1)c^2h^2]^{1/2}\} + Ah^4 + Bh^6 + Ch^8 + Dh^{10} + Eh^{12}$$

where c is curvature, h is the vertical distance from the lens surface to the optical axis, k is conic constant and A, B, C, D, and E are aspheric coefficients.

In the first embodiment, the conic constant k and the aspheric coefficients A, B, C, D, E of each aspheric lens are shown in Table 2.

TABLE 2

| Surface Number | k | A | B | C | D | E |
|---|---|---|---|---|---|---|
| S13 | −3.477E+00 | −4.269E−02 | 7.835E−03 | −1.784E−03 | 1.559E−03 | −3.282E−04 |
| S14 | −4.516E+00 | −2.090E−02 | 1.038E−02 | 3.261E−03 | −2.936E−03 | 9.569E−04 |
| S18 | 2.607E−02 | 2.511E−02 | −5.997E−03 | −1.175E−03 | 1.002E−03 | −1.626E−04 |

TABLE 2-continued

| Surface Number | k | A | B | C | D | E |
|---|---|---|---|---|---|---|
| S19 | 9.208E−01 | −6.636E−04 | 7.895E−03 | −2.561E−03 | −7.430E−04 | 4.924E−04 |
| S110 | 1.482E+01 | −3.621E−02 | 2.399E−02 | −4.329E−03 | −3.049E−03 | 1.309E−03 |
| S111 | −4.636E−01 | −1.920E−03 | 1.558E−02 | −5.311E−03 | −3.125E−04 | 2.603E−04 |

Table 3 shows the parameters and condition values for conditions (1)-(11) in accordance with the first embodiment of the invention. It can be seen from Table 3 that the lens assembly 1 of the first embodiment satisfies the conditions (1)-(11).

TABLE 3

| BFL | 3.34 mm | | | | |
|---|---|---|---|---|---|
| TTL/BFL | 3.144 | $f_2/f_1$ | −2.233 | $f_2/f_4$ | 1.523 |
| $f_1/f_5$ | 0.959 | $R_{11}/R_{12}$ | 4.313 | $R_{31}/R_{32}$ | −4.749 |
| TTL/$T_1$ | 20.657 | TTL/$T_3$ | 8.142 | TTL/$T_4$ | 12.118 |
| TTL/$AT_{34}$ | 74.001 | TTL/$AT_{45}$ | 106.552 | | |

By the above arrangements of the lenses and stop ST1, the lens assembly 1 of the first embodiment can meet the requirements of optical performance.

Figure 2A:
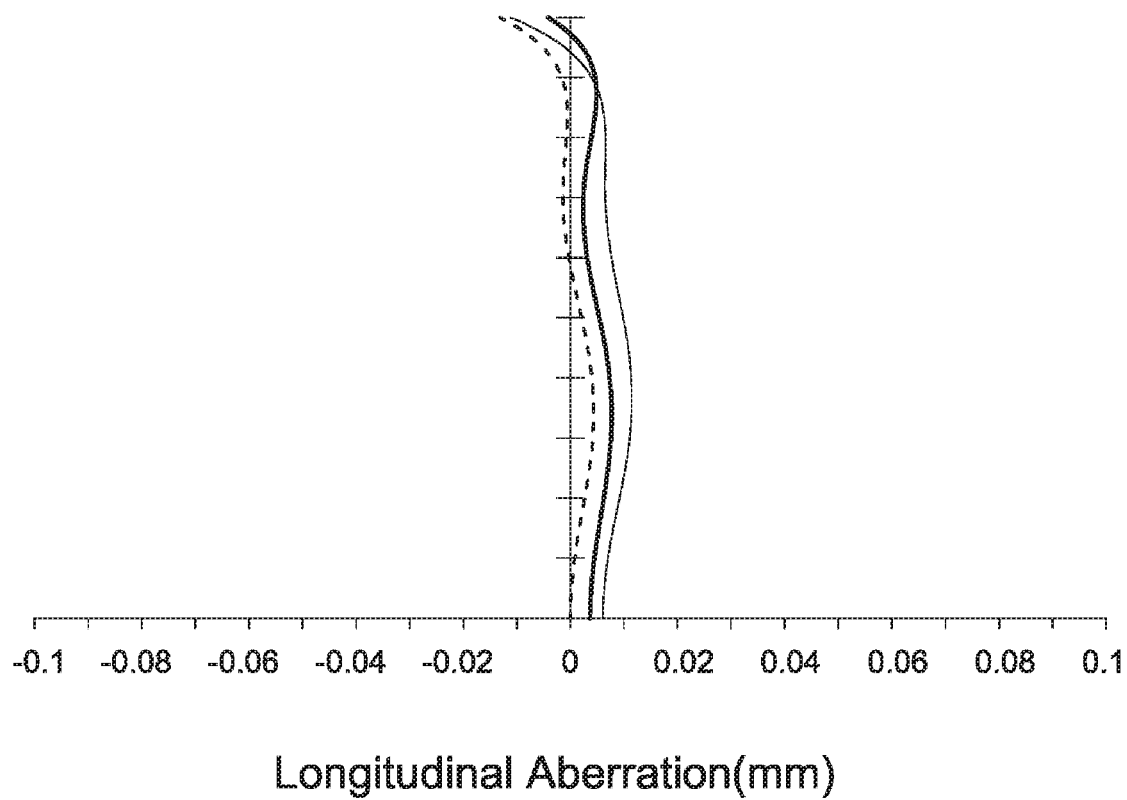
FIG. 2A depicts a longitudinal aberration diagram of the wide-angle lens assembly in accordance with the first embodiment of the invention.

It can be seen from FIG. 2A that the longitudinal aberration in the lens assembly 1 of the first embodiment ranges from −0.02 mm to 0.02 mm.

Figure 2B:
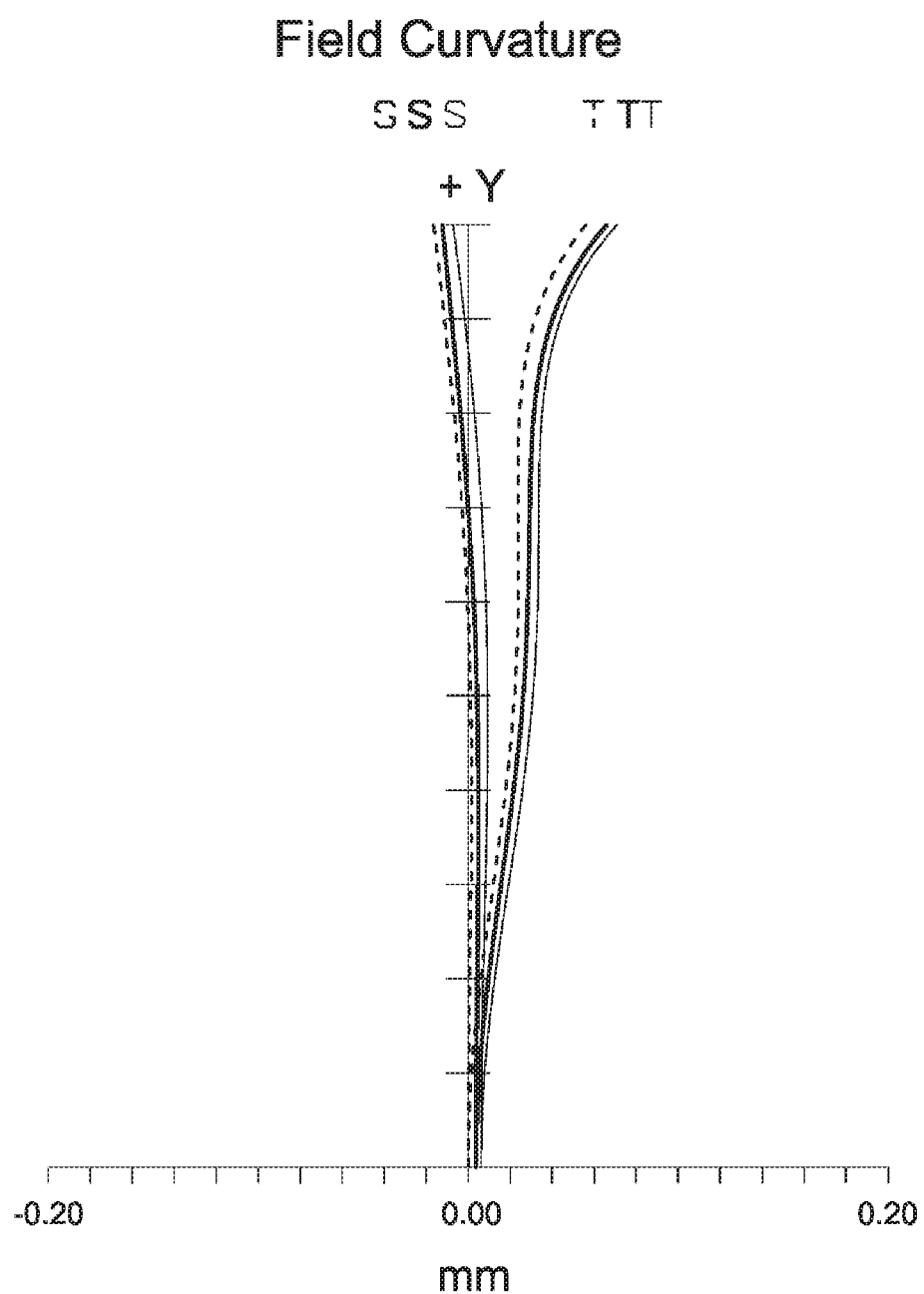
FIG. 2B is a field curvature diagram of the wide-angle lens assembly in accordance with the first embodiment of the invention.

It can be seen from FIG. 2B that the field curvature of tangential direction and sagittal direction in the lens assembly 1 of the first embodiment ranges from −0.02 mm to 0.08 mm.

Figure 2C:
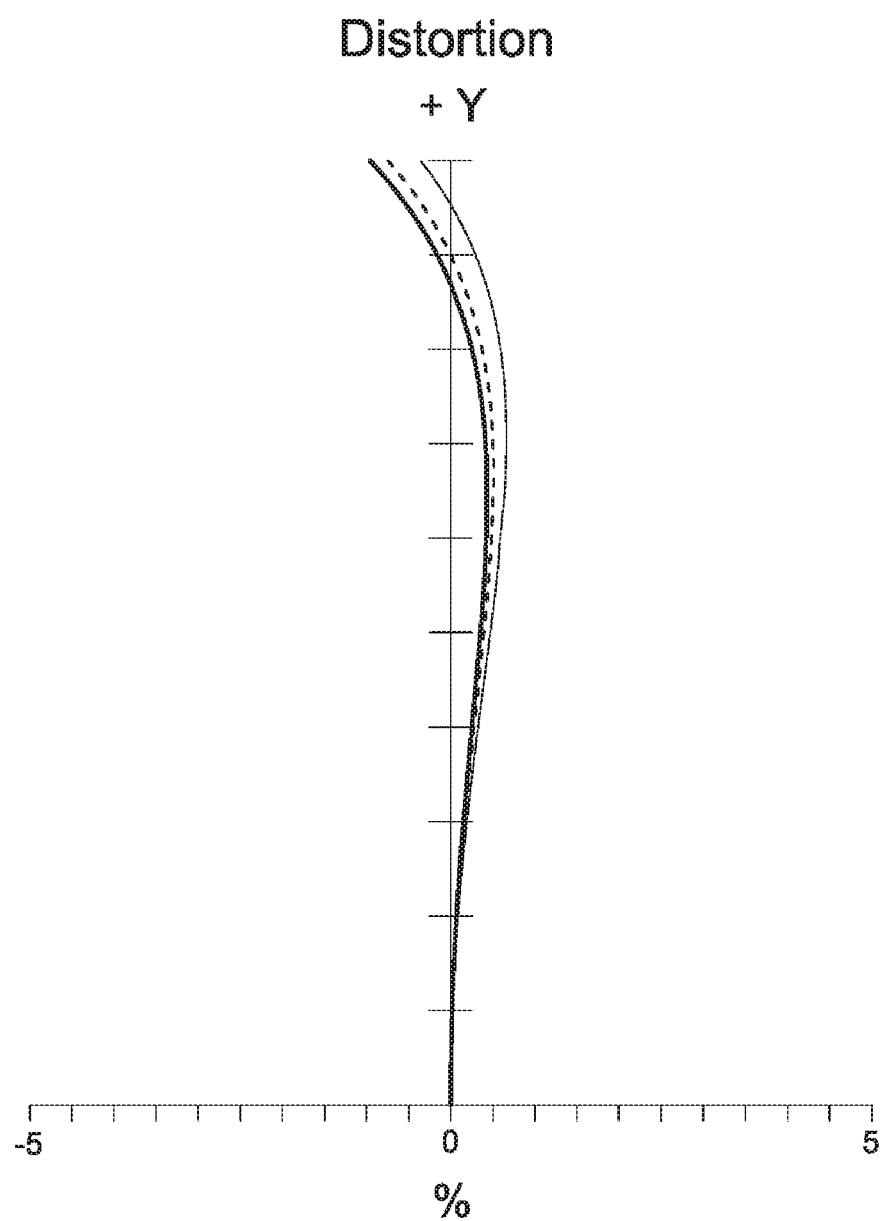
FIG. 2C is a distortion diagram of the wide-angle lens assembly in accordance with the first embodiment of the invention.

It can be seen from FIG. 2C that the distortion in the lens assembly 1 of the first embodiment ranges from −1% to 1%.

Figure 2D:
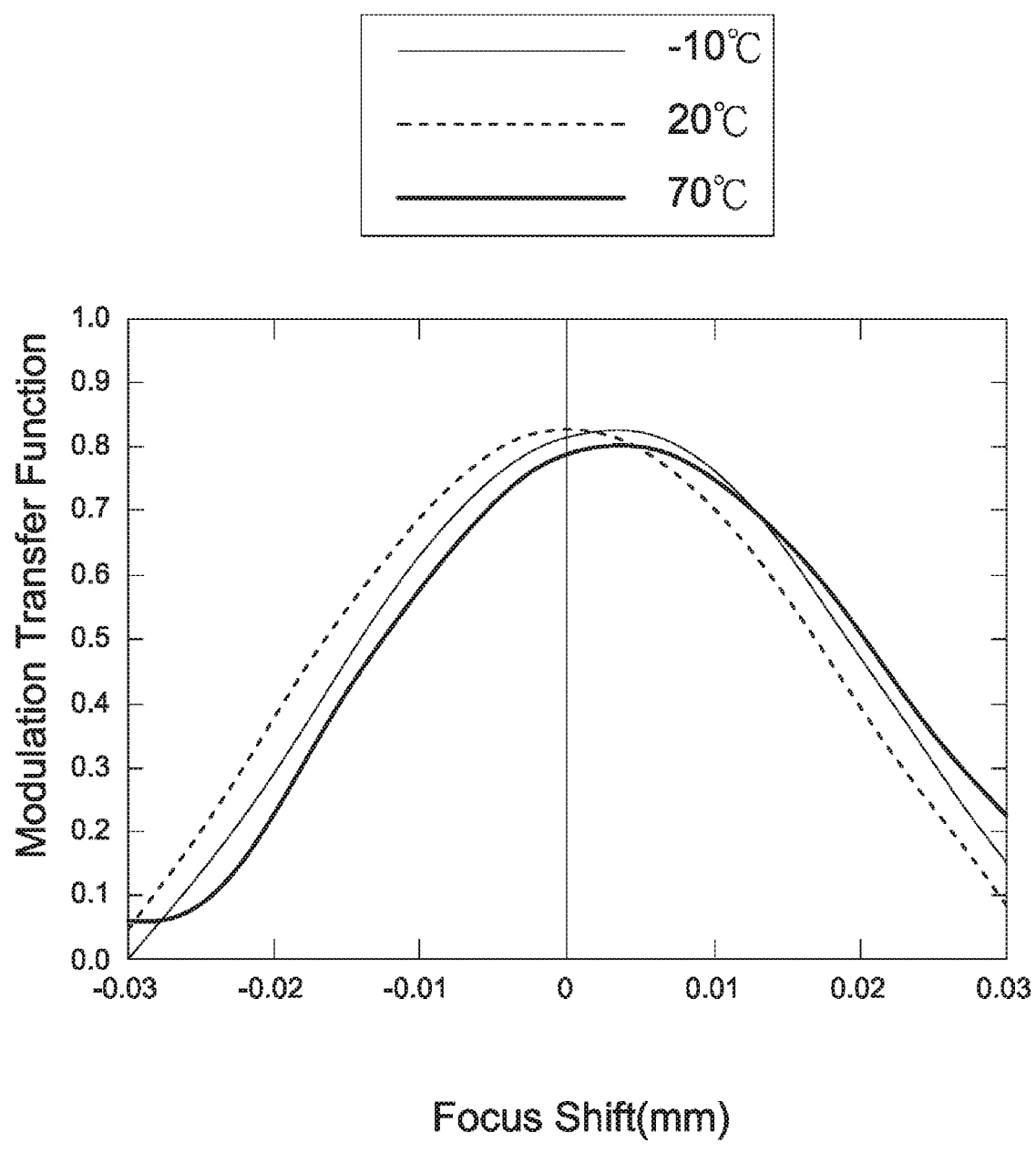
FIG. 2D is a through focus modulation transfer function diagram of the wide-angle lens assembly at −10° C., 20° C., and 70° C. in accordance with the first embodiment of the invention.

It can be seen from FIG. 2D that when the temperature is at −10° C., 20° C., or 70° C. the focus offset in the lens assembly 1 of the first embodiment ranges from −0.03 mm to 0.03 mm, and the modulation transfer function in the lens assembly 1 of the first embodiment ranges from 0.0 to 0.83.

It is obvious that the longitudinal aberration, the field curvature, and the distortion of the lens assembly 1 of the first embodiment can be corrected effectively. The resolution and the depth of focus of the lens assembly 1 of the first embodiment can also meet the requirements. Therefore, the lens assembly 1 of the first embodiment is capable of good optical performance.

Referring to FIG. 3, FIG. 3 is the lens layout diagram and the optical path of the wide-angle lens assembly in accordance with the second embodiment, the lens assembly 2 includes a first lens L21, a second lens L22, a stop ST2, a third lens L23, a fourth lens L24, a fifth lens L25, an optical filter OF2, and cover glass CG2, all of which are arranged in order from an object side to an image side along an optical axis A2. In operation, an image of light rays from the object side is formed at an image plane IMA2.

According to the foregoing, wherein both an objective surface S212 and an image surface S213 of the optical filter OF2 are flat surfaces;

Both an objective surface S214 and an image surface S215 of the cover glass CG2 are flat surfaces;

With the above design of the lenses and stop ST2 and at least anyone of the conditions (1)-(11) satisfied, the lens assembly 2 can have an effective shorter total lens length an effective increased field of view, an effective increased resolution, an effective resisted environmental temperature change and is capable of an effective corrected aberration.

Table 4 shows the optical specification of the lens assembly 2 in FIG. 3.

TABLE 4

| Effective Focal Length = 2.41991 mm | | | F-number = 2.24 | | |
|---|---|---|---|---|---|
| Total Lens Length = 10.50 mm | | | Field Of View = 127.6 Degrees | | |

| Surface Number | Radius of Curvature (mm) | Thickness (mm) | Nd | Vd | Effective Focal Length (mm) | Remark |
|---|---|---|---|---|---|---|
| S21 | 9.74 | 0.49 | 1.834807 | 42.7137 | −3.3617 | The First Lens L21 |
| S22 | 2.14 | 2.20 | | | | |
| S23 | −24.99 | 1.21 | 1.543915 | 55.9512 | 9.3628 | The Second Lens L22 |
| S24 | −4.32 | 0.39 | | | | |
| S25 | ∞ | 0.12 | | | | Stop ST2 |
| S26 | 27.78 | 1.07 | 1.583126 | 59.3747 | 4.01 | The Third Lens L23 |
| S27 | −2.53 | 0.13 | | | | |
| S28 | 5.91 | 1.03 | 1.535218 | 56.1153 | 4.15 | The Fourth Lens L24 |
| S29 | −3.36 | 0.09 | | | | |
| S210 | −6.29 | 0.59 | 1.661342 | 20.3729 | −3.09 | The Fifth Lens L25 |
| S211 | 3.18 | 0.52 | | | | |
| S212 | ∞ | 0.210 | 1.517 | 64.167 | | Optical Filter OF2 |
| S213 | ∞ | 2.000 | | | | |
| S214 | ∞ | 0.400 | 1.517 | 64.167 | | Cover Glass CG2 |
| S215 | ∞ | 0.045 | | | | |

The definition of the aspheric surface sag z of each aspheric lens in table 4 is the same as that of in Table 1 and is not described here again.

In the second embodiment, the conic constant k and the aspheric coefficients A, B, C, D, E of each aspheric lens are shown in Table 5.

TABLE 5

| Surface Number | k | A | B | C | D | E |
|---|---|---|---|---|---|---|
| S23 | −1.881E+02 | −4.516E−02 | −2.633E−03 | −2.847E−04 | 3.231E−04 | 7.962E−05 |
| S24 | −1.388E+01 | −3.554E−02 | 2.569E−03 | 1.030E−02 | −6.456E−03 | 1.697E−03 |
| S28 | −5.770E−02 | −1.360E−02 | −9.533E−04 | −8.888E−04 | 6.158E−04 | 2.006E−05 |
| S29 | 2.988E+00 | −1.031E−02 | 5.037E−03 | 1.621E−03 | −4.936E−05 | 1.831E−04 |
| S210 | 1.467E+01 | −3.895E−02 | 8.280E−03 | 4.878E−04 | 3.572E−04 | −5.878E−05 |
| S211 | −3.801E+00 | −1.328E−02 | 3.386E−03 | −1.308E−03 | 3.713E−04 | −5.493E−05 |

Table 6 shows the parameters and condition values for conditions (1)-(11) in accordance with the second embodiment of the invention. It can be seen from Table 6 that the lens assembly 2 of the second embodiment satisfies the conditions (1)-(11).

TABLE 6

| BFL | 3.17 mm | | | | |
|---|---|---|---|---|---|
| TTL/BFL | 3.313 | $f_2/f_1$ | −2.785 | $f_2/f_4$ | 2.258 |
| $f_1/f_5$ | 1.088 | $R_{11}/R_{12}$ | 4.561 | $R_{31}/R_{32}$ | −10.989 |
| TTL/$T_1$ | 21.227 | TTL/$T_3$ | 9.787 | TTL/$T_4$ | 10.162 |
| TTL/$AT_{34}$ | 81.647 | TTL/$AT_{45}$ | 115.419 | | |

By the above arrangements of the lenses and stop ST2, the lens assembly 2 of the second embodiment can meet the requirements of optical performance.

Figure 4A:
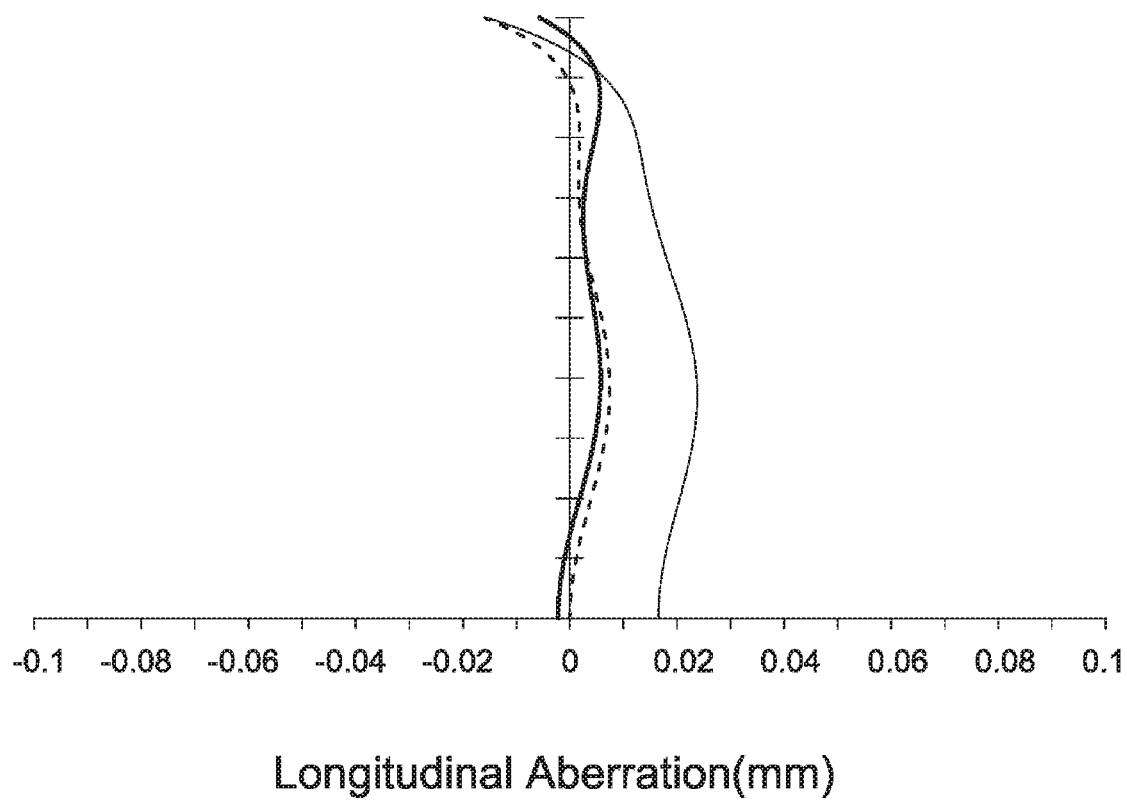
FIG. 4A depicts a longitudinal aberration diagram of the wide-angle lens assembly in accordance with the second embodiment of the invention.

It can be seen from FIG. 4A that the longitudinal aberration in the lens assembly 2 of the second embodiment ranges from −0.02 mm to 0.03 mm.

Figure 4B:
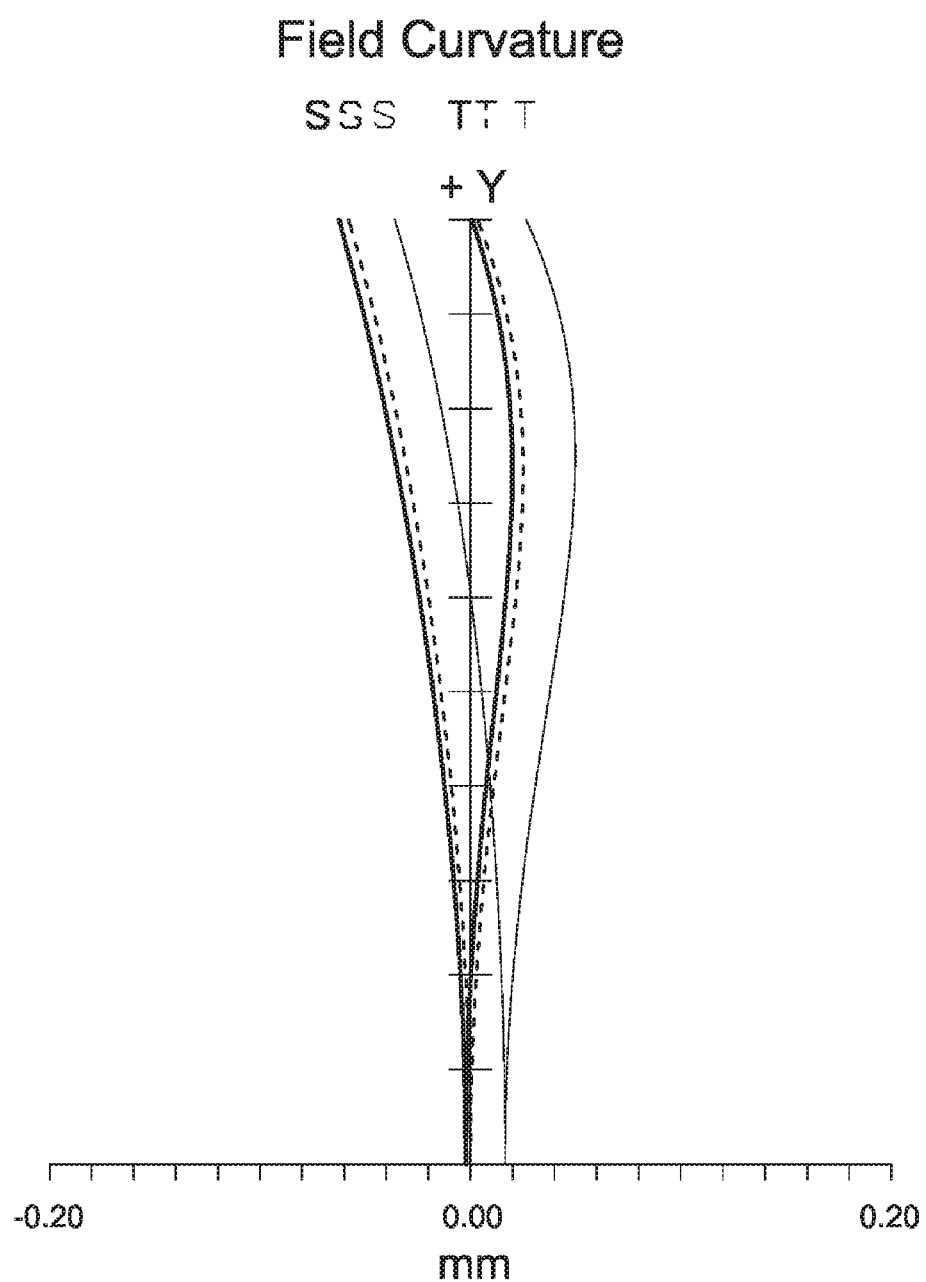
FIG. 4B is a field curvature diagram of the wide-angle lens assembly in accordance with the second embodiment of the invention.

It can be seen from FIG. 4B that the field curvature of tangential direction and sagittal direction in the lens assembly 2 of the second embodiment ranges from −0.08 mm to 0.06 mm.

Figure 4C:
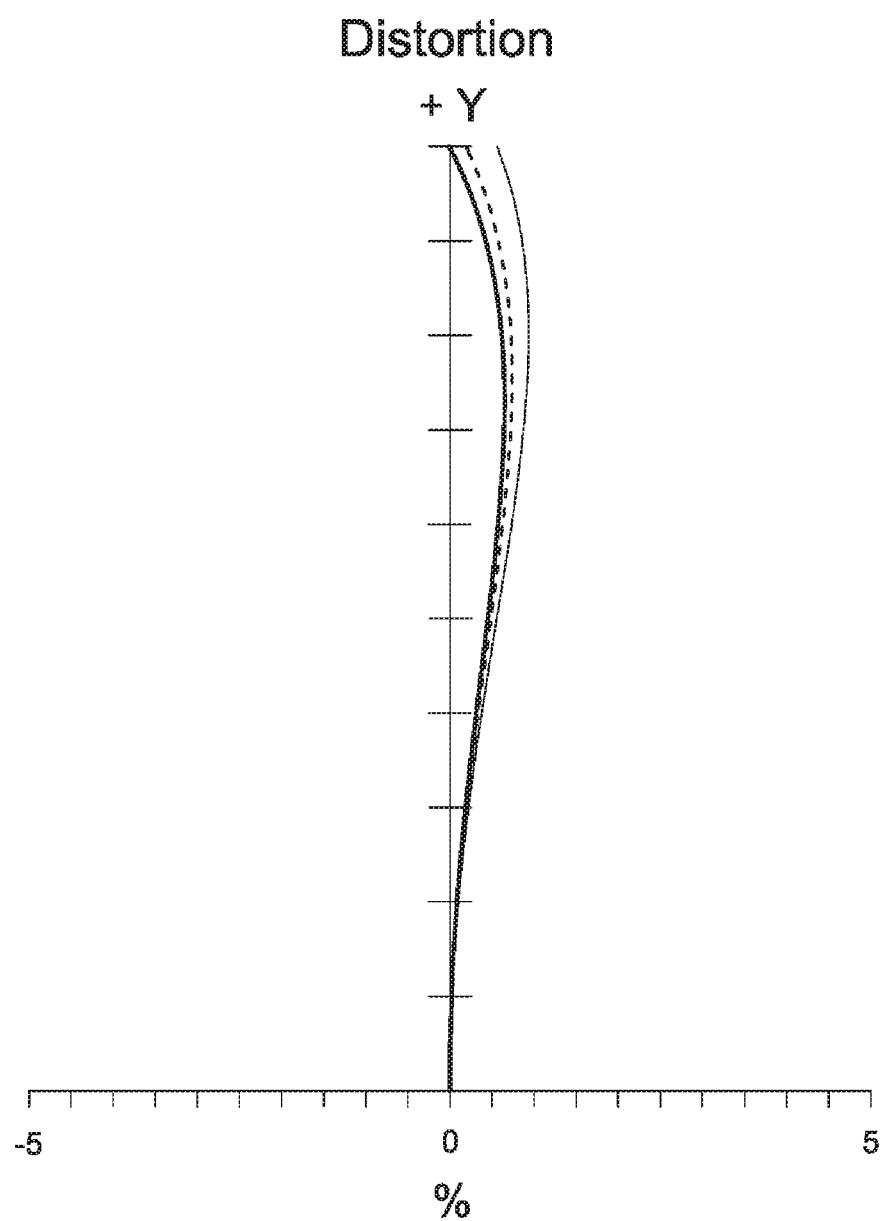
FIG. 4C is a distortion diagram of the wide-angle lens assembly in accordance with the second embodiment of the invention.

It can be seen from FIG. 4C that the distortion in the lens assembly 2 of the second embodiment ranges from 0% to 1%.

Figure 4D:
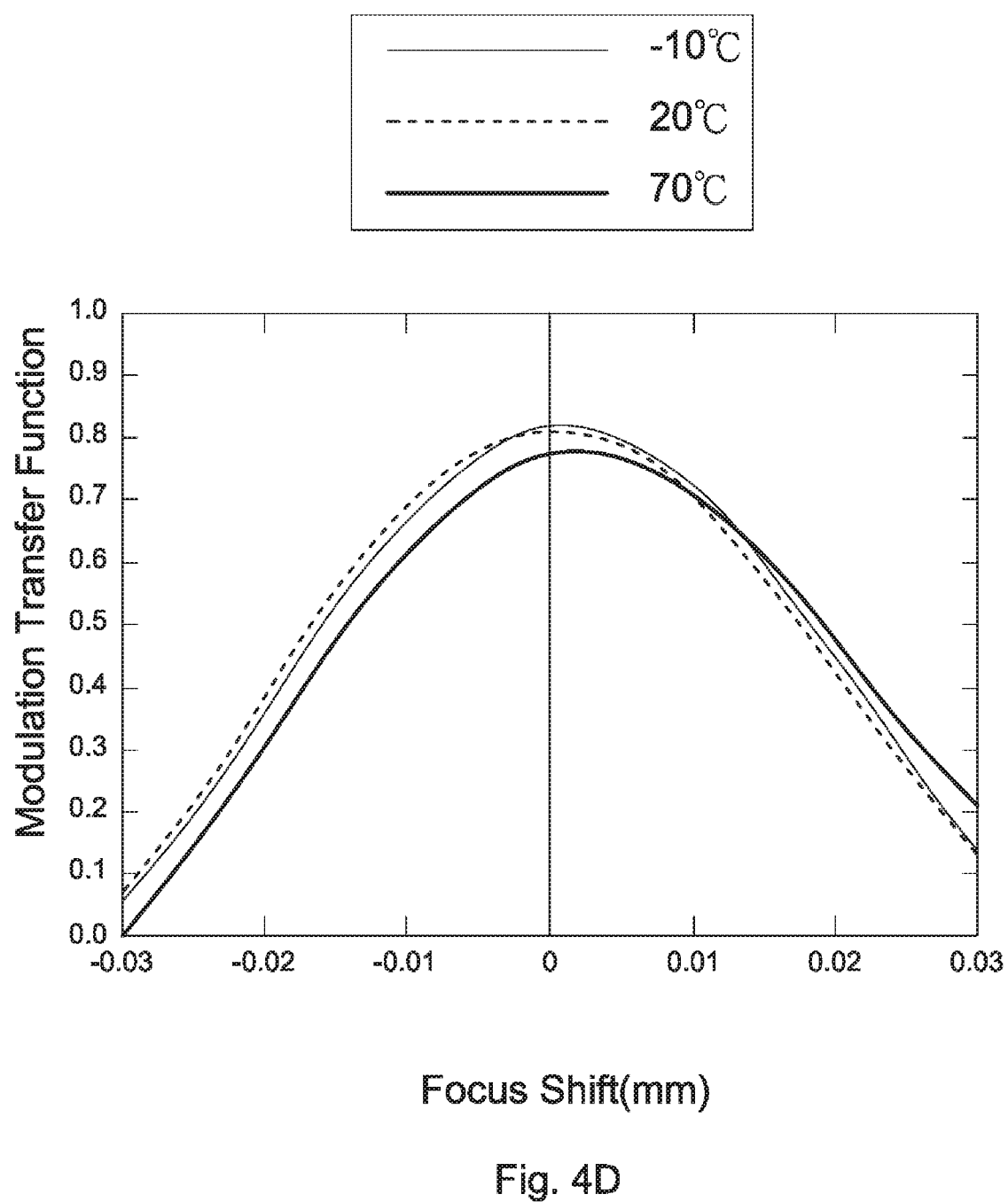
FIG. 4D is a through focus modulation transfer function diagram of the wide-angle lens assembly at −10° C., 20° C., and 70° C. in accordance with the second embodiment of the invention.

It can be seen from FIG. 4D that when the temperature is at −10° C., 20° C., or 70° C. the focus offset in the lens assembly 2 of the second embodiment ranges from −0.03 mm to 0.03 mm, and the modulation transfer function in the lens assembly 2 of the second embodiment ranges from 0.0 to 0.82.

It is obvious that the longitudinal aberration, the field curvature, and the distortion of the lens assembly 2 of the second embodiment can be corrected effectively. The resolution and the depth of focus of the lens assembly 2 of the second embodiment can also meet the requirements. Therefore, the lens assembly 2 of the second embodiment is capable of good optical performance.

Referring to FIG. 5, FIG. 5 is the lens layout diagram and the optical path of the wide-angle lens assembly in accordance with the third embodiment, the lens assembly 3 includes a first lens L31, a second lens L32, a stop ST3, a third lens L33, a fourth lens L34, a fifth lens L35, an optical filter OF3, and a cover glass CG3, all of which are arranged in order from an object side to an image side along an optical axis OA3. In operation, an image of light rays from the object side is formed at an image plane IMA3.

According to the foregoing, wherein both an objective surface S312 and an image surface S313 of the optical filter OF3 are flat surfaces.

Both an objective surface S314 and an image surface S315 of the cover glass CG3 are flat surfaces;

With the above design of the lenses and stop ST3 and at least any one of the conditions (1)-(11) satisfied, the lens assembly 3 can have an effective shorter total lens length, an effective increased field of view, an effective increased resolution, an effective resisted environmental temperature change, and is capable of an effective corrected aberration.

Table 7 shows the optical specification of the lens assembly 3 in FIG. 5.

TABLE 7

| Effective Focal Length = 2.6895 mm | | | F-number = 2.24 | | |
|---|---|---|---|---|---|
| Total Lens Length = 10.50 mm | | | Field Of View = 130.2 Degrees | | |

| Surface Number | Radius of Curvature (mm) | Thickness (mm) | Nd | Vd | Effective Focal Length (mm) | Remark |
|---|---|---|---|---|---|---|
| S31 | 7.01 | 0.49 | 1.788001 | 47.3685 | −3.6729 | The First Lens L31 |
| S32 | 1.99 | 1.87 | | | | |
| S33 | −3.75 | 1.92 | 1.543915 | 55.9512 | 7.0049 | The Second Lens L32 |
| S34 | −2.24 | 0.24 | | | | |
| S35 | ∞ | −0.03 | | | | Stop ST3 |
| S36 | 10.55 | 1.26 | 1.58913 | 61.135 | 4.08 | The Third Lens L33 |
| S37 | −2.98 | 0.09 | | | | |
| S38 | 25.00 | 0.82 | 1.543915 | 55.9512 | 5.63 | The Fourth Lens L34 |
| S39 | −3.47 | 0.09 | | | | |
| S310 | −6.70 | 0.47 | 1.661342 | 20.3729 | −3.64 | The Fifth Lens L35 |
| S311 | 3.91 | 0.67 | | | | |
| S312 | ∞ | 0.210 | 1.517 | 64.167 | | Optical ilter OF3 |
| S313 | ∞ | 1.949 | | | | |
| S314 | ∞ | 0.400 | 1.517 | 64.167 | | Cover Glass CG3 |
| S315 | ∞ | 0.045 | | | | |

The definition of the aspheric surface sag z of each aspheric lens in table 7 is the same as that of in Table 1 and is not described here again.

In the third embodiment, the conic constant k and the aspheric coefficients A, B, C, D, E of each aspheric lens are shown in Table 8.

TABLE 8

| Surface Number | k | A | B | C | D | E |
|---|---|---|---|---|---|---|
| S33 | −4.469E+00 | −4.473E−02 | 4.412E−03 | −7.405E−04 | 1.166E−03 | −2.291E−04 |
| S34 | −4.902E+00 | −2.797E−02 | 8.660E−03 | 6.569E−03 | −5.199E−03 | 1.393E−03 |
| S38 | 2.422E+02 | 2.365E−02 | −3.532E−03 | 1.011E−03 | 1.908E−04 | 2.049E−04 |
| S39 | 1.196E+00 | −1.433E−03 | 1.178E−02 | −3.368E−03 | −4.576E−04 | 7.205E−04 |
| S310 | 1.759E+01 | −1.749E−02 | 8.925E−03 | −3.097E−03 | −1.345E−03 | 6.549E−04 |
| S311 | 1.958E−00 | 1.062E−02 | −2.056E−03 | −1.531E−03 | −1.373E−04 | 1.230E−04 |

Table 9 shows the parameters and condition values for conditions (1)-(11) in accordance with the third embodiment of the invention. It can be seen from Table 9 that the lens assembly 3 of the third embodiment satisfies the conditions (1)-(11).

TABLE 9

| BFL | 3.27 mm | | | | |
|---|---|---|---|---|---|
| TTL/BFL | 3.213 | $f_2/f_1$ | −1.907 | $f_2/f_4$ | 1.243 |
| $f_1/f_5$ | 1.010 | $R_{11}/R_{12}$ | 3.521 | $R_{31}/R_{32}$ | −3.539 |
| TTL/$T_1$ | 21.260 | TTL/$T_3$ | 8.314 | TTL/$T_4$ | 12.787 |
| TTL/$AT_{34}$ | 112.391 | TTL/$AT_{45}$ | 110.821 | | |

By the above arrangements of the lenses and stop ST3, the lens assembly 3 of the third embodiment can meet the requirements of optical performance.

Figure 6A:
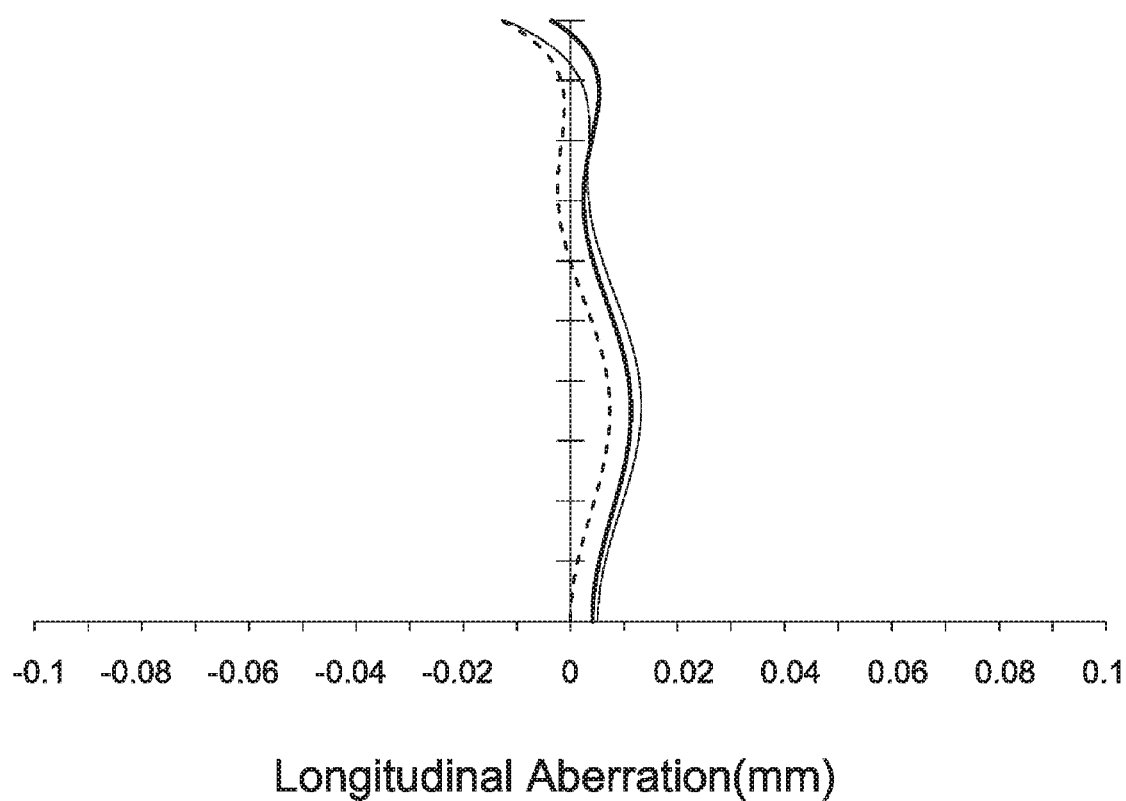
FIG. 6A depicts a longitudinal aberration diagram of the wide-angle lens assembly in accordance with the third embodiment of the invention.

It can be seen from FIG. 6A that the longitudinal aberration in the lens assembly 3 of the third embodiment ranges from −0.02 mm to 0.02 mm.

Figure 6B:
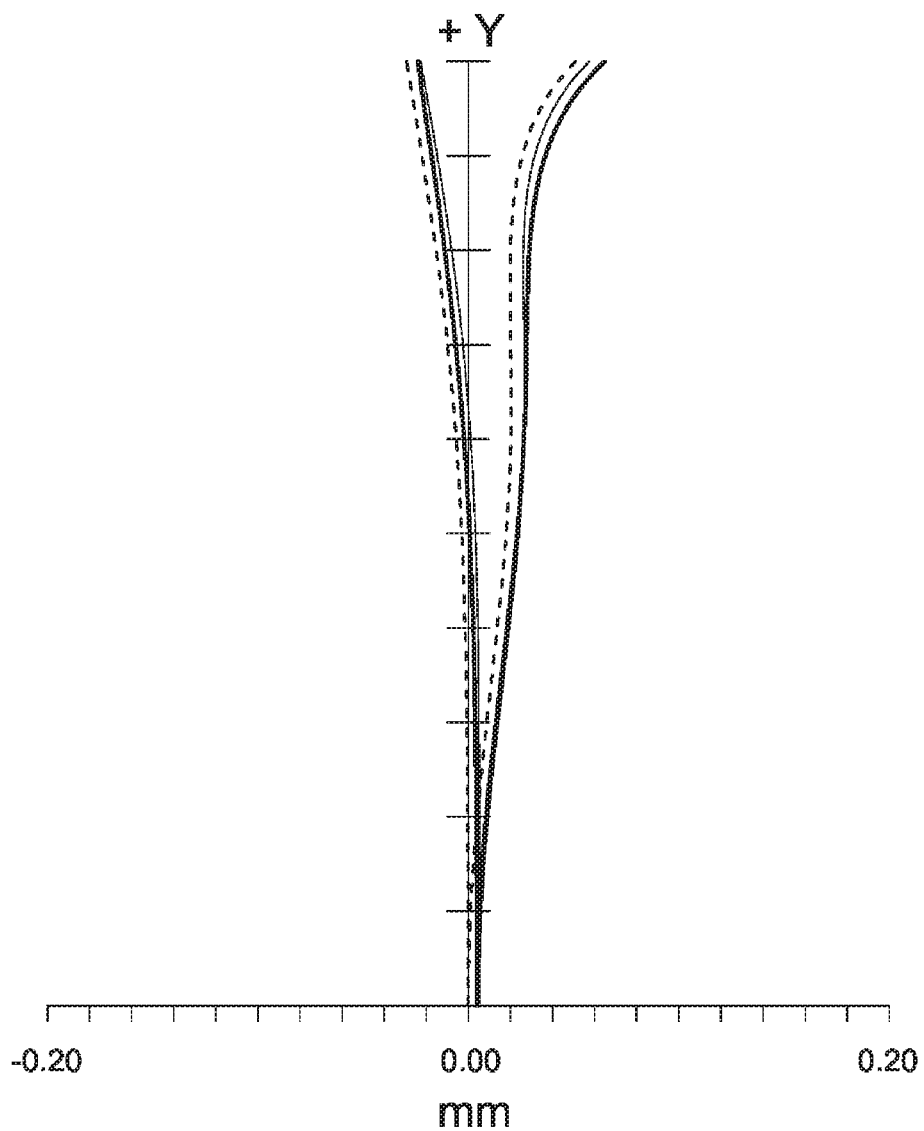
FIG. 6B is a field curvature diagram of the wide-angle lens assembly in accordance with the third embodiment of the invention.

It can be seen from FIG. 6B that the field curvature of tangential direction and sagittal direction in the lens assembly 3 of the third embodiment ranges from −0.04 mm to 0.08 mm.

Figure 6C:
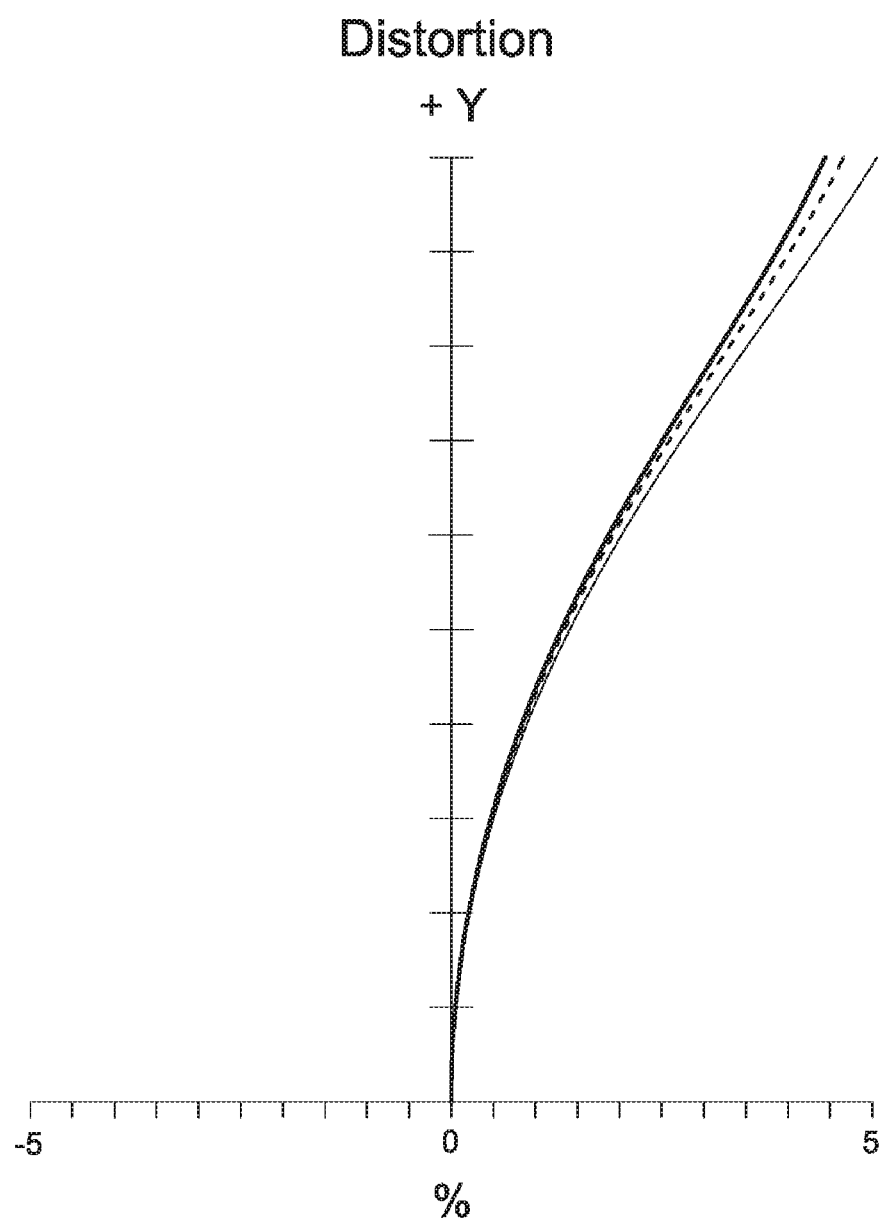
FIG. 6C is a distortion diagram of the wide-angle lens assembly in accordance with the third embodiment of the invention.

It can be seen from FIG. 6C that the distortion in the lens assembly 3 of the third embodiment ranges from 0% to 5.1%.

Figure 6D:
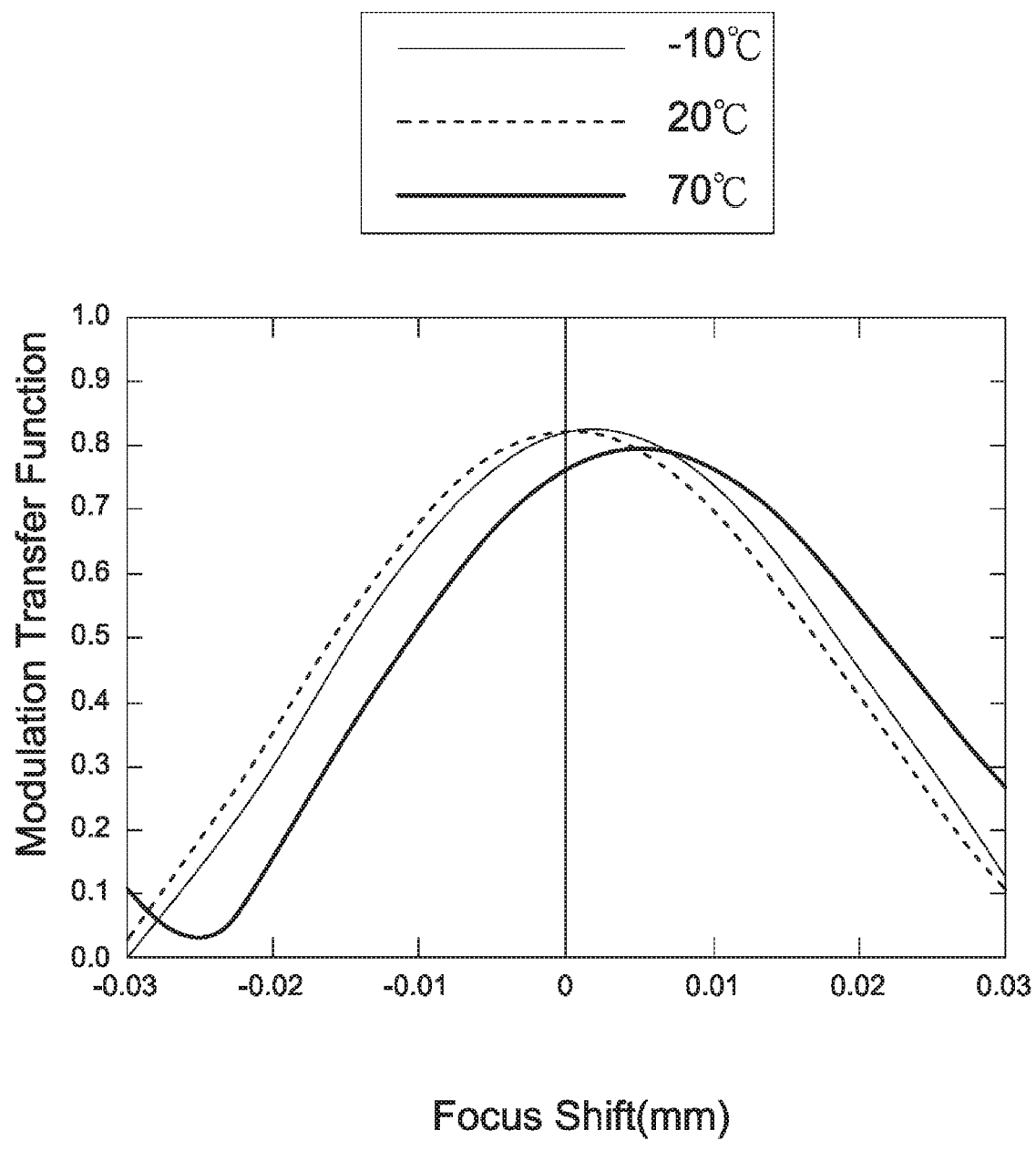
FIG. 6D is a through focus modulation transfer function diagram of the wide-angle lens assembly at −10° C., 20° C., and 70° C. in accordance with the third embodiment of the invention.

It can be seen from FIG. 6D that when the temperature is at −10° C., 20° C., or 70° C. the focus offset in the lens assembly 3 of the third embodiment ranges from −0.03 mm to 0.03 mm, and the modulation transfer function in the lens assembly 3 of the third embodiment ranges from 0.0 to 0.82.

It is obvious that the longitudinal aberration, the field curvature, and the distortion of the lens assembly 3 of the third embodiment can be corrected effectively. The resolution and the depth of focus of the lens assembly 3 of the third embodiment can also meet the requirements. Therefore, the lens assembly 3 of the third embodiment is capable of good optical performance.

Referring to FIG. 7, FIG. 7 is the lens layout diagram of the wide-angle lens assembly in accordance with the fourth embodiment, the lens assembly 4 includes a first lens L41, a second lens L42, a stop ST4, a third lens L43, a sixth lens L46, a fourth lens L44, a fifth lens L45, and an optical filter OF4, all of which are arranged in order from an object side to an image side along an optical axis OA4. In operation, an image of light rays from the object side is formed at an image plane IMA4.

According to the foregoing, wherein both an objective surface S414 and an image surface S415 of the optical filter OF4 are flat surfaces.

With the above design of the lenses and stop ST4 and at least one of the conditions (1)-(11) satisfied, the lens assembly 4 can have an effective shorter total lens length, an effective increased field of view, an effective increased resolution, an effective resisted environmental temperature change, and is capable of an effective corrected aberration.

Table 10 shows the optical specification of the lens assembly 4 in FIG. 7.

TABLE 10

| | Effective Focal Length = 2.025337613 mm | | F-number = 2.0054978995161 | | |
|---|---|---|---|---|---|
| | Total Lens Length = 12.0463262938364 mm | | Field Of View = 150 Degrees | | |

| Surface Number | Radius of Curvature (mm) | Thickness (mm) | Nd | Vd | Effective Focal Length (mm) | Remark |
|---|---|---|---|---|---|---|
| S41 | 14.29364 | 1 | 1.696799 | 55.521308 | −3.6665 | The First Lens L41 |
| S42 | 2.11091 | 1.2593665 | | | | |
| S43 | −15.7754 | 3.981935 | 1.544514 | 56.003278 | 5.5243 | The Second Lens L42 |
| S44 | −2.75914 | 0.0039607 | | | | |
| S45 | ∞ | 0.0638947 | | | | Stop ST4 |
| S46 | 3.271095 | 1.6980371 | 1.496999 | 81.545888 | 3.5936 | The Third Lens L43 |
| S47 | −3.27109 | 0.2558871 | | | | |
| S48 | −24.6506 | 0.4510033 | 1.661316 | 20.381513 | −4.4134 | The Sixth Lens L46 |
| S49 | 3.367923 | 0.2972975 | | | | |
| S410 | 5.31317 | 1.2814375 | 1.544514 | 56.003278 | 7.9805 | The Fourth Lens L44 |
| S411 | −22.2224 | 0.0661971 | | | | |

TABLE 10-continued

Effective Focal Length = 2.025337613 mm     F-number = 2.0054978995161
Total Lens Length = 12.0463262938364 mm     Field Of View = 150 Degrees

| Surface Number | Radius of Curvature (mm) | Thickness (mm) | Nd | Vd | Effective Focal Length (mm) | Remark |
|---|---|---|---|---|---|---|
| S412 | 4.477886 | 0.4999124 | 1.544514 | 56.003278 | −11.1051 | The Fifth Lens L45 |
| S413 | 2.474661 | 0.6803079 | | | | |
| S414 | ∞ | 0.3 | 1.5168 | 64.167336 | | Optical Filter OF4 |
| S415 | ∞ | 0.2012054 | | | | |
| S416 | ∞ | 0.0058841 | | | | |

The definition of the aspheric surface sag z of each aspheric lens in table 10 is the same as that of in Table 1 and is not described here again.

In the fourth embodiment, the conic constant k and the aspheric coefficients A, B, C, D, E of each aspheric lens are shown in Table 11.

TABLE 11

| Surface Number | k | A | B | C | D | E | F | G |
|---|---|---|---|---|---|---|---|---|
| S43 | −1.35E+01 | −1.36E−02 | −225E−04 | −3.28E−04 | −4.10E−05 | 8.78E−05 | −2.41E−05 | 2.30E−06 |
| S44 | 1.48E+00 | 2.19E−02 | 2.46E−04 | 3.33E−03 | −1.66E−03 | 8.27E−04 | −3.29E−04 | 8.25E−05 |
| S48 | −1.02E+02 | 5.07E−02 | −4.05E−02 | 3.30E−04 | 1.23E−02 | −4.98E−03 | 2.54E−06 | 1.82E−04 |
| S49 | 3.15E+00 | 6.89E−02 | −5.23E−02 | 4.89E−03 | 7.24E−03 | −1.36E−03 | −1.05E−03 | 2.42E−04 |
| S410 | 4.32E+00 | 9.00E−03 | 1.84E−03 | −4.10E−03 | 1.21E−03 | 1.87E−04 | −1.15E−05 | −3.72E−05 |
| S411 | 4.13E+01 | −1.18E−03 | 1.18E−02 | 5.27E−04 | −7.53E−04 | 8.96E−06 | 1.02E−05 | 2.06E−07 |
| S412 | −1.47E+01 | −4.11E−02 | 1.85E−02 | −1.82E−03 | −2.20E−04 | 5.69E−05 | −5.24E−06 | −6.31E−07 |
| S413 | −1.16E+00 | −6.59E−02 | 1.71E−02 | −3.00E−03 | 9.89E−05 | 7.10E−05 | −8.60E−06 | −5.82E−07 |

Table 12 shows the parameters and condition values for conditions (1)-(11) in accordance with the fourth embodiment of the invention.

TABLE 12

| | | | | | |
|---|---|---|---|---|---|
| BFL | 1.187 mm | | | | |
| TTL/BFL | 10.145 | $f_2/f_1$ | −1.507 | $f_2/f_4$ | 0.692 |
| $f_1/f_5$ | 0.33 | $R_{11}/R_{12}$ | 6.771 | $R_{31}/R_{32}$ | −1 |
| $TTL/T_1$ | 12.046 | $TTL/T_3$ | 7.094 | $TTL/T_4$ | 9.4 |
| $TTL/AT_{34}$ | 21.776 | $TTL/AT_{45}$ | 181.977 | | |

By the above arrangements of the lenses and stop ST4, the lens assembly 4 of the fourth embodiment can meet the requirements of optical performance.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide-angle lens assembly, comprising sequentially from an object side to an image side along an optical axis:
   a first lens which is a meniscus lens with negative refractive power;
   a second lens which is a meniscus lens with positive refractive power;
   a third lens with positive refractive power, comprising a convex surface facing the object side;
   a fourth lens with positive refractive power, comprising a convex surface facing the object side; and
   a fifth lens with negative refractive power;
   wherein the wide-angle lens assembly satisfies:

$3<TTL/BFL<3.5$, wherein TTL is an interval from an object side surface of the first lens to an image plane along the optical axis and BFL is an interval from an image side surface of the fifth lens to the image plane along the optical axis;
   wherein the wide-angle lens assembly further satisfies at least one of following conditions:

$-3<f_2/f_1<-1$, $1<f_2/f_4<3$, $3<R_{11}/R_{12}<5$, $-11<R_{31}/R_{32}<-3$, $20<TTL/T_1<21.5$, wherein $f_1$ is an effective focal length of the first lens, $f_2$ is an effective focal length of the second lens, $f_4$ is an effective focal length of the fourth lens, $T_1$ is a thickness of the first lens, $R_{11}$ is a radius of curvature of the object side surface of the first lens, $R_{12}$ is a radius of curvature of the image side surface of the first lens, $R_{31}$ is a radius of curvature of the objective side surface of the third lens, and $R_{32}$ is a radius of curvature of the image side surface of the third lens.

2. The wide-angle lens assembly as claimed in claim 1, wherein the first lens further comprises a convex surface facing the object side and a concave surface facing an image side, the second lens further comprises a concave surface facing the object side and a convex surface facing the image side, the third lens further comprises a convex surface facing the image side, the fourth lens further comprises a convex surface facing the image side.

3. The wide-angle lens assembly as claimed in claim 2, wherein the fifth lens further comprises a concave surface or a convex surface facing the object side and another concave surface facing the image side.

4. The wide-angle lens assembly as claimed in claim 2, wherein the wide-angle lens assembly further satisfies:

$$0.5<f_1/f_5<1.5,$$

wherein $f_1$ is the effective focal length of the first lens and $f_5$ is an effective focal length of the fifth lens.

5. The wide-angle lens assembly as claimed in claim 2, wherein the wide-angle lens assembly further satisfies:

$$8<TTL/T_3<10,$$

wherein TTL is the interval from the object side surface of the first lens to the image plane along the optical axis and $T_3$ is a thickness of the third lens.

6. The wide-angle lens assembly as claimed in claim 2, wherein the wide-angle lens assembly further satisfies:

$$10<TTL/T_4<13,$$

wherein TTL is the interval from the object side surface of the first lens to the image plane along the optical axis and $T_4$ is a thickness of the fourth lens.

7. The wide-angle lens assembly as claimed in claim 2, wherein the wide-angle lens assembly further satisfies:

$$72.08<TTL/AT_{34}<114.31, \text{ or}$$

$$106.3<TTL/AT_{45}<115.7$$

wherein TTL is the interval from the object side surface of the first lens to the image plane along the optical axis, $AT_{34}$ is an air-interval from the third lens to each fourth lenses along the optical axis, and $AT_{45}$ is an air-interval from the fourth lens to each fifth lens along the optical axis.

8. The wide-angle lens assembly as claimed in claim 1, wherein the wide-angle lens assembly further satisfies:

$$0.5<f_1/f_5<1.5,$$

wherein $f_1$ is the effective focal length of the first lens and $f_5$ is an effective focal length of the fifth lens.

9. The wide-angle lens assembly as claimed in claim 1, wherein the wide-angle lens assembly further satisfies:

$$8<TTL/T_3<10,$$

wherein TTL is the interval from the object side surface of the first lens to the image plane along the optical axis and $T_3$ is a thickness of the third lens.

10. The wide-angle lens assembly as claimed in claim 1, wherein the wide-angle lens assembly further satisfies:

$$10<TTL/T_4<13,$$

wherein TTL is the interval from the object side surface of the first lens to the image plane along the optical axis and $T_4$ is a thickness of the fourth lens.

11. The wide-angle lens assembly as claimed in claim 1, wherein the wide-angle lens assembly further satisfies:

$$72.08<TTL/AT_{34}<114.31,$$

wherein TTL is the interval from the object side surface of the first lens to the image plane along the optical axis and $AT_{34}$ is an air-interval from the third lens to each fourth lenses along the optical axis.

12. The wide-angle lens assembly as claimed in claim 1, wherein the wide-angle lens assembly further satisfies:

$$106.3<TTL/AT_{45}<115.7,$$

wherein TTL is the interval from the object side surface of the first lens to the image plane along the optical axis and $AT_{45}$ is an air-interval from the fourth lens to each fifth lens along the optical axis.

13. A wide-angle lens assembly, comprising sequentially from an object side to an image side along an optical axis:
a first lens which is a meniscus lens with negative refractive power;
a second lens which is a meniscus lens with positive refractive power and comprises a concave surface facing the object side and a convex surface facing the image side;
a third lens with positive refractive power, comprising a convex surface facing the object side;
a fourth lens with positive refractive power; and
a fifth lens with negative refractive power;
wherein the wide-angle lens assembly satisfies:

$$3<TTL/BFL<3.5,$$

wherein TTL is an interval from an object side surface of the first lens to an image plane along the optical axis and BFL is an interval from an image side surface of the fifth lens to the image plane along the optical axis;
wherein the wide-angle lens assembly further satisfies at least one of following conditions:

$$-3<f_2/f_1<-1,$$

$$1<f_2/f_4<3,$$

$$3<R_{11}/R_{12}<5,$$

$$-11<R_{31}/R_{32}<-3,$$

$$20<TTL/T_1<21.5,$$

wherein $f_1$ is an effective focal length of the first lens, $f_2$ is an effective focal length of the second lens, $f_4$ is an effective focal length of the fourth lens, $T_1$ is a thickness of the first lens, $R_{11}$ is a radius of curvature of the object side surface of the first lens, $R_{12}$ is a radius of curvature of the image side surface of the first lens, $R_{31}$ is a radius of curvature of the objective side surface of the third lens, and $R_{32}$ is a radius of curvature of the image side surface of the third lens.

14. The wide-angle lens assembly as claimed in claim 13, wherein the wide-angle lens assembly further satisfies at least one of following conditions:

$$0.5<f_1/f_5<1.5,$$

$$8<TTL/T_3<10,$$

$$10<TTL/T_4<13,$$

$$72.08<TTL/AT_{34}<114.31,$$

$$106.3<TTL/AT_{45}<115.7,$$

wherein $f_1$ is the effective focal length of the first lens, $f_5$ is an effective focal length of the fifth lens, TTL is the interval from the object side surface of the first lens to the image plane along the optical axis, $T_3$ is a thickness of the third lens, $T_4$ is a thickness of the fourth lens, $AT_{34}$ is an air-interval from the third lens to each fourth lenses along the optical axis, and $AT_{45}$ is an air-interval from the fourth lens to each fifth lens along the optical axis.

* * * * *